3,105,767
GLOSS STABLE PARAFFIN WAX COMPOSITIONS
Barekin G. Arabian, Houston, Tex., assignor to Shell
Oil Company, New York, N.Y., a corporation of Delaware
No Drawing. Filed Nov. 19, 1962, Ser. No. 238,702
10 Claims. (Cl. 106—270)

This invention relates to novel wax compositions having improved properties. More particularly, it is directed to crystalline paraffin wax compositions modified to improve the gloss stability of the waxes.

Waxes derived from petroleum crude oils may be divided into two principal classes. These comprise the highly crystalline paraffin (including normal- and iso-paraffin) waxes and the amorphous, plastic (microcrystalline) waxes. For the most part, the crystalline paraffin waxes are those obtained by the dewaxing of lubricating oil distillates or by fractionation of residual waxes. They predominate in substantially straight-chain paraffin hydrocarbon molecules and contain only minor proportions of isoparaffins and even smaller amounts of olefins and cyclic structures. They are characterized by their sharp melting points, their high degree of crystallinity and their ability to resist the effects of light and heat insofar as degradation of color is concerned. Microcrystalline waxes, on the other hand, are identified by their plastic and often sticky condition, their characteristic yellow color and their strong tendency to discolor in the presence of light and/or heat. When the latter are mixed with soft wax fractions and lubricating oil, the composition is called "petrolatum."

An important difference between these two classes of petroleum waxes comprises the initially high gloss which may be obtained with the crystalline paraffin waxes, and the lack of gloss so characteristic of the microcrystalline waxes, possibly due to their fine-grained or amorphous structure. While it has been noted that crystalline paraffin waxes can be coated on wax paper and the like to give an initially glossy sheet, this gloss gradually degrades, especially at room temperature or above, with increasing rapidity as the transition point of the waxes is approached.

The retention of gloss by paraffin wax surfaces is of major importance especially from the standpoint of saleability. Therefore, it is highly desirable to treat or modify crystalline paraffin waxes so that the initial gloss can be retained over a reasonably long storage period, taking into account the potential time of storage and the expected temperature range at which such waxes will be kept.

It is an object of the present invention to improve the gloss characteristics of crystalline paraffin waxes. It is another object of the present invention to improve the gloss stability of paraffin waxes. It is a further object of this invention to improve the appearance of papers waxed with wax compositions predominating in paraffin waxes. Other objects will become apparent during the following disclosure.

Now, in accordance with the present invention, it has been found that color-stable, but gloss-unstable, crystalline paraffin petroleum waxes may be improved with respect to retention of gloss by the incorporation therein of a gloss-stabilizing proportion of certain restricted classes of a phenol having a configuration of the group consisting of (1)

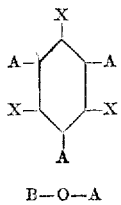

(2) B—O—A and (3) 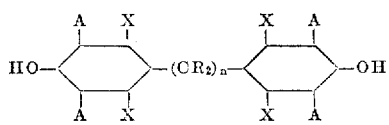

wherein X is a substituent of the group consisting of methyl, hydrogen and hydroxyl, A is a 3,5-dialkyl-4-hydroxybenzyl substituent wherein each of the alkyl radicals has 1–8 carbon atoms, at least one of the alkyl radicals being branched on the alpha carbon atom, B is a substituent of the group consisting of A—, A—O—$(CH_2)_n$— and $C_{8-18}$ alkyl, C=O, R is a monovalent radical independently selected from the group consisting of hydrogen (—H) and methyl (—$CH_3$), and $n$ is a whole number of from 1 through 4. Phenols within class (3) in which $n$ is from 1 through 2 and in which the alkylene group (—$(CR_2)_n$—) contains no more than three carbon atoms are preferred.

The present invention is highly restricted with respect to the precise configuration of the several classes of phenols outlined above, since many other phenols having somewhat similar but distincly different configurations have been found entirely useless for gloss stabilization. Many of these phenols, which are ineffective as gloss stabilizers may actually be useful only in wax compositions (i.e., as oxidation inhibitors) but this is normally a property not associated with gloss stability insofar as it has been determined.

The classes of phenols particularly falling within the scope of the present invention, are as follows:

(1) Alkylene bis[2,6-bis(3,5-dialkyl-4-hydroxybenzyl)phenols]
(2) α,α,-Oxy-bis(2,6-dialkyl-p-cresols)
(3) α,α,-Alkylenedioxy-bis(2,6-dialkyl-p-cresols)
(4) Fatty acid esters of 3,5-dialkyl-p-cresols
(5) Benzenetriyl(2,6-dialkyl-p-cresols)
(6) Tris(dialkylhydroxybenzyl)phenols The most effective species falling within the scope of the present invention are illustrated by the following:

TABLE I

*Alkylene Bis[2,6-Bis(3,5-Dialkyl-4-Hydroxybenzyl) Phenols]*

4,4′-isopropylidine bis[2,6-bis(3,5-di-tert-butyl-4-hyroxybenzyl)phenol]
4,4′-ethylene bis[2,6-bis(3,5-di-tert-butyl-4-hydroxybenzyl)phenol]
4,4′-methylene bis[2,6-bis(3,5-di-tert-butyl-4-hydroxybenzyl)phenol]
4,4′-isopropylidene bis[2,6-bis(3,5-di-tert-butyl-2-methyl-4-hydroxybenzyl)phenol]
4,4′-isopropylidene bis[2,6-bis(3,5-di-tert-butyl-2-ethyl-4-hydroxybenzyl)phenol]
4,4′-methylene bis[2,6-bis(3-tert-butyl-5-isopropyl-4-hydroxybenzyl)phenol]
4,4′-propylene bis[2,6-bis(3,5-di-tert-butyl-4-hydroxybenzyl)phenol]
4,4′-trimethylene bis[2,6-bis(3,5-di-tert-butyl-2-methyl-4-hydroxybenzyl)phenol]
4,4′-ethylidene bis[2,6-bis(3,5-di-tert-butyl-4-hydroxybenzyl)phenol]

TABLE II

α,α'-Oxy-Bis(2,6-Dialkyl-p-Cresols)

α,α'-Oxy-bis(2,6-di-tert-butyl-p-cresol)
α,α'-Oxy-bis(2-tert-butyl-6-isopropyl-p-cresol)
α,α'-Oxy-bis(2,5,6-tri-tert-butyl-p-cresol)
α,α'-Oxy-(2,6-di-tert-butyl-p-cresol)(2-tert-butyl-p-cresol)
α,α'-Oxy-(2,6-di(1-ethylhexyl-p-cresol)

TABLE III

α,α'-Alkylenedioxy-Bis(2,6-Dialkyl-p-Cresols)

α,α'-Ethylenedioxy-bis(2,6-di-tert-butyl-p-cresol)
α,α'-Isopropylidenedioxy-bis(2,6-di-tert-butyl-p-cresol)
α,α'-Methylenedioxy-bis(2,6-di-isoamyl-p-cresol)
α,α'-Ethylenedioxy(2,6-tert-butyl-p-cresol)(2,6-di-isoamyl-p-cresol)
α,α'-Butylenedioxy-bis(2,6-di-tert-butyl-p-cresol)

TABLE IV

Fatty Acid Esters of 3,5-Dialkyl-p-Cresols 3,5-di-tert-butyl-4-hydroxybenzyl laurate
3,5-di-tert-butyl-4-hydroxybenzyl stearate
3,5-di-tert-butyl-4-hydroxybenzyl octoate
3-tert-butyl-5-isoamyl-4-hydroxybenzyl myristate
3,5-di-tert-butyl-2-methyl-4-hydroxybenzyl caprate

TABLE V

Benzenetriyl(2,6-Dialkyl-p-Cresols)

α,α',α''-(2,4,6-trimethyl-1,3,5-benzenetriyl)tris(2,6-di-tert-butyl-p-cresol)
α,α',α''-(1,3,5-benzenetriyl)tris-(2,6-di-tert-butyl-p-cresol)
α,α',α''-(2,6-diethyl-1,3,5-benzenetriyl)tris(2,6-di-tert-butyl-p-cresol)
α,α',α''-(2,4-dimethyl-6-isopropyl-1,3,5-benzenetriyl)-tris
(2,6-di-tert-butyl-p-cresol)

TABLE VI

Tris(Dialkylhydroxybenzyl)Phenols 2,4,6-tris(3,5-di-tert-butyl-4-hydroxybenzyl)phenol
3,5-dimethyl-2,4,6-tris(3,5-di-tert-butyl-4-hydroxybenzyl)phenol
2,4,6-tris(3,5-isoamyl-4-hydroxybenzyl)phenol The major components of the present crystalline paraffin waxes comprise normal and isoparaffin hydrocarbon waxes usually derived from petroleum crude oils and having melting points within the range from about 100 to about 190° F. Preferably these are between about 100 and 165° F., and still more preferably between about 110 and about 150° F. The crystalline paraffin waxes usually predominate in normal paraffin hydrocarbons and may comprise a single wax but ordinarily will be a mixture of relatively closely related paraffin wax molecules. These are obtained by well-known dewaxing procedures from waxy lubricating oils, normally distillate oils. In such procedures the general practice is to distill a broad range lubricating oil into a number of relatively narrow fractions, extract the aromatics and color bodies by clay percolation or by solvents such as phenol or the like.

The waxy lubrication oil is dispersed in a solvent such as a methyl ethyl ketone, methyl isobutyl ketone, acetone, or mixtures thereof, usually with other diluents such as benzene and the like. The wax and oil solution is cooled to a predetermined level in order to cause crystallization of the wax components. The latter are removed by centrifuging or filtering and then may be purified by recrystallization or other well-known procedures. Normally they should contain less than about 1% by weight of contaminating oils, namely, those oils which occur naturally in the lubricating oil fractions from which the waxes were separated or oils having viscosities less than about 200 SSU at 210° F.

Higher melting paraffin waxes may be obtained either by close fractionation of high melting distillate paraffin waxes or by fractional recrystallization of waxes obtained from residual lubricating oil stocks. Thus, in the dewaxing of certain residual oils from selected crude sources, a crude wax is obtained which is made up of substantial portions of microcrystalline wax components and high melting paraffin wax components. These can be separated by fractional crystallization to yield highly plastic microcrystalline wax and at the same time high melting paraffin wax having melting points in the order of 150–195° F. These high melting point paraffin waxes are especially suitable for the modification of distillate paraffin waxes but are regarded as being paraffins of the same general character and of higher molecular weight than those present in the distillate lubricating oil cuts.

In order to materially improve the gloss stability of crystalline paraffin waxes, it is usually necessary to employ only fractional percentages of the above types of phenols (including their mixtures) the preferred concentration of phenol being from about 0.1 to 1% based on the total wax composition.

The examples which follow illustrate the principles of the present invention. A crystalline paraffin wax obtained by the dewaxing of an East Texas crude oil distillate and refined by percolation through clay, having a melting point of 138–140° F. was used in this comparative test. The gloss retention test comprises coating a card board specimen with a wax composition to produce an initial gloss of about 85–90 units (percent reflectant) when measured with a fixed 60° angle in a standard Gardner gloss meter. After seven days' storage at a temperature of 73° F. and a relative humidity of 50%, the gloss level is measured again. The difference between this measurement and the initial gloss is reported as "loss of gloss." Unmodified wax lost 44% of its original gloss under these standardized conditions. The incorporation of 0.1–0.5% by weight of a number of phenols falling within the present invention caused a striking improvement in gloss retention as indicated by Table VII which follows:

TABLE VII

Gloss Tests With 138/140 Fully Refined Paraffin Wax

| Example | Additive | Loss of Gloss[1] after 7 days' Storage at 73° F. | | |
|---|---|---|---|---|
| | | Additive 0.1% | Additive 0.2% | Additive 0.5% |
| 1 | α, α'-ethylenedioxy-bis-(2,6-di-tert-butyl-p-cresol). | 41 | | 0 |
| 2 | α, α'-oxy-bis(2,6-di-tert-butyl-p-cresol). | 35 | 19 | 0 |
| 3 | 3,5-di-tert-butyl-4-hydroxybenzyl laurate. | 45 | 20 | 0 |
| 4 | α, α', α''-(2,4,6-trimethyl 1,3,5-benzenetriyl) tris-(2,6-di-tert-butyl-p-cresol). | 36 | 25 | 8 |
| 5 | 2,4,6-tris(3,5-di-tert-butyl-4-hydroxybenzyl) phenol. | 39 | 15 | 0 |
| 6 | 3,5-dimethyl-2,4,6-tris (3,5,di-tert-butyl-4-hydroxybenzyl)phenol. | 36 | 11 | 4 |
| 7 | 4,4'-isopropylidene bis[2,6-bis(3, 5-di-tert-butyl-4-hydroxybenzyl)phenol]. | 16 | 11 | 3 |

[1] Measured by standard 60° Gardner Gloss Meter. Wax considered stable if loss not greater than 10 units after 7 days at 73° F. Proportionately stable if loss not greater than 10 units after 7 days at 73° F. Proportionately less stable above that value.

*Example 8.*—A wax composition having improved gloss stability consisting of 99.0% by weight 138–140° F. melting point paraffin wax and 1.0% by weight 4,4'-isopropyldine-bis[2,6-bis(3,5-di-tert-butyl-4-hydroxybenzyl)phenol] which has the chemical structural formula

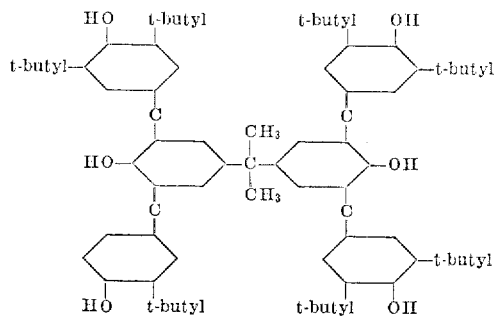

*Example 9.*—A wax composition having improved gloss ability consisting of 99.3% by weight of a mixture of two paraffinic petroleum waxes having melting points of 38–140° F. and 161–165° F. and 0.7% by weight 4,4'-propylene bis[2,6-bis(3,5-di-tert-butyl-4-hydroxybenzyl)-phenol], the propylene radical being of the configuration

This patent application is a continuation-in-part of applicant's copending U.S. patent application Serial No. 29,243, filed August 4, 1961.

I claim as my invention:

1. An improved wax composition comprising a major amount of a paraffin wax and a minor amount, sufficient to inhibit gloss deterioration of 4,4'-isopropylidene bis[2,6-bis(3,5-di-tert-butyl-4-hydroxybenzyl)phenol].

2. An improved wax composition comprising a major amount of a paraffin wax and a minor amount, sufficient to inhibit gloss deterioration of 3,5-dimethyl-2,4,6-tris-(3,5-di-tert-butyl-4-hydroxybenzyl)phenol.

3. An improved wax composition comprising a major amount of a paraffin wax and a minor amount, sufficient to inhibit gloss deterioration of 3,4,6-tris(3,5-di-tert-butyl-4-hydroxybenzyl)phenol.

4. An improved wax composition comprising a major amount of a paraffin wax and a minor amount, sufficient to inhibit gloss deterioration of 3,5-di-tert-butyl-4-hydroxybenzyl laurate.

5. An improved wax composition comprising a major amount of a paraffin wax and a minor amount, sufficient to inhibit gloss deterioration of $\alpha,\alpha'$-oxy-bis(2,6-di-tert-butyl-p-cresol).

6. An improved wax composition comprising a major amount of a paraffin wax and a minor amount, sufficient to inhibit gloss deterioration of a phenol having a configuration of the group consisting of

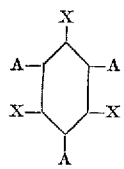

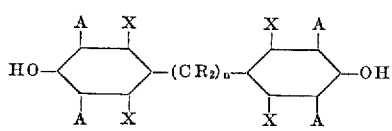

wherein X is a substituent of the group consisting of methyl, hydrogen and hydroxyl, A is a 3,5-dialkyl-4-hydroxybenzyl substituent, wherein each of the alkyl radicals has 1–8 carbon atoms, at least one of the alkyl radicals being branched on the alpha carbon atom and B is a substituent of the group consisting of A—, A—O—(CH$_2$)$_n$ and C$_{8-18}$C=O, R is a monovalent radical independently selected from the group consisting of hydrogen and methyl and $n$ is a whole number from 1 through 4.

7. An improved wax composition comprising a major amount of a paraffin wax and a minor amount, sufficient to inhibit gloss deterioration of a phenol having the configuration

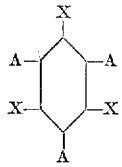

wherein X is a substituent of the group consisting of methyl, hydrogen and hydroxyl and A is a 3,5-dialkyl-4-hydroxybenbyl substituent, wherein each of the alkyl radicals has 1–8 carbon atoms, at least one of the alkyl radicals being branched on the alpha carbon atom.

8. An improved wax composition comprising a major amount of a paraffin wax and a minor amount, sufficient to inhibit gloss deterioration of a phenol having the configuration

B—O—A wherein A is a 3,5-dialkyl-4-hydroxybenzyl substituent, wherein each of the alkyl radicals has 1–8 carbon atoms, at least one of the alkyl radicals being branched on the alpha carbon atom and B is a substituent of the group consisting of A—, A—O—(CH$_2$)$_n$- and C$_{8-18}$C=O, and $n$ is an integer from 1 to 4.

9. An improved wax composition comprising a major amount of a paraffin wax and a minor amount, sufficient to inhibit gloss deterioration of

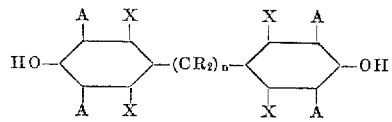

wherein X is a substituent of the group consisting of methyl, hydrogen, and hydroxyl, $n$ is an integer between 1 and 4, and A is a 3,5-dialkyl-4-hydroxybenzyl substituent, wherein each of the alkyl radicals has 1–8 carbon atoms, at least one of the alkyl radicals being branched on the alpha carbon atom, R is a monovalent radical independently selected from the group consisting of hydrogen and methyl and $n$ is a whole number from 1 through 4.

10. An improved wax composition comprising a major amount of a paraffin wax and a minor amount, sufficient to inhibit gloss deterioration of 4,4'-propylene [bis 2,6-bis(3,5-di-tert-butyl-4-hydroxybenzyl)phenol].

References Cited in the file of this patent
UNITED STATES PATENTS

| 2,944,086 | Coffield | July 5, 1960 |
| 3,053,803 | Jaffe | Sept. 11, 1962 |

OTHER REFERENCES

Morawetz: "Phenolic Antioxidants for Paraffinic Materials," Industrial and Engineering Chemistry, July 1949, pages 1442–1447.